United States Patent
Silverstein et al.

(10) Patent No.: US 12,399,926 B2
(45) Date of Patent: Aug. 26, 2025

(54) DOCUMENT CONCATENATION AND ONTOLOGICAL STRUCTURING BASED ON SIMILARITIES

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Kelley Anders, East New Market, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/403,134

(22) Filed: Jan. 3, 2024

(65) Prior Publication Data

US 2025/0217402 A1    Jul. 3, 2025

(51) Int. Cl.
*G06F 16/30*    (2019.01)
*G06F 16/36*    (2019.01)
*G06F 40/186*    (2020.01)

(52) U.S. Cl.
CPC .......... *G06F 16/367* (2019.01); *G06F 40/186* (2020.01)

(58) Field of Classification Search
None
See application file for complete search history.

(56) References Cited

U.S. PATENT DOCUMENTS

| | | | |
|---|---|---|---|
| 11,074,395 B2 | 7/2021 | Anders | |
| 11,636,847 B2 | 4/2023 | Tomkins | |
| 11,734,365 B1 | 8/2023 | Gottlob | |
| 11,935,317 B2* | 3/2024 | Hosokawa | G06V 30/416 |
| 2009/0164539 A1* | 6/2009 | Pudipeddi | G06F 16/11 |
| 2012/0078595 A1* | 3/2012 | Balandin | G06F 16/367 |
| | | | 703/6 |
| 2017/0220680 A1* | 8/2017 | Shattuck | G06F 16/3326 |
| 2018/0239959 A1* | 8/2018 | Bui | G06F 16/93 |
| 2020/0401935 A1* | 12/2020 | Malhotra | G06N 5/04 |
| 2023/0030086 A1* | 2/2023 | Martinez Ayala | G06F 16/367 |
| 2023/0134989 A1* | 5/2023 | Hron, II | G06F 40/279 |
| | | | 706/12 |
| 2024/0095856 A1* | 3/2024 | Subrahmanian | G06F 40/166 |

OTHER PUBLICATIONS

Adobe, "Compare two versions of a PDF file (Acrobat Pro)", Last updated on Jun. 9, 2023, 11 pages.
Disclosed Anonymously, "Retrieving Documents by Combining Document Embeddings and TF-IDF", An IP.com Prior Art Database Technical Disclosure, IP.com No. IPCOM000269251D, IP.com Electronic Publication Date: Mar. 31, 2022, 9 pages.

(Continued)

*Primary Examiner* — Jau Shya Meng
(74) *Attorney, Agent, or Firm* — Jordan T. Schiller (57) ABSTRACT

A computer-implemented method for document concatenation and ontological structuring. The method includes identifying a downloaded file and determining whether the downloaded file is associated with one or more saved files. Based on determining that the downloaded file is associated with the one or more saved files, developing an ontological structure storing the downloaded file and the one or more saved files.

20 Claims, 3 Drawing Sheets

(56) References Cited

OTHER PUBLICATIONS

Disclosed Anonymously, Cognitive File Save System, An IP.com Prior Art Database Technical Disclosure, IP.com No. IPCOM000268461D, IP.com Electronic Publication Date: Jan. 31, 2022, 7 pages.
Disclosed Anonymously, System and Associated Methods for Linking New Concepts Into an Existing Ontology as Subconceptof, An IP.com Prior Art Database Technical Disclosure, IP.com No. IPCOM000270338D IP.com Electronic Publication Date: Jun. 29, 2022, 5 pages.
IBM, "Cloud database solutions", accessed on Oct. 16, 2023, 5 pages.
IBM, "Database software and solutions", accessed on Oct. 16, 2023, 7 pages.
Microsoft, "Compare and merge two versions of a document", accessed on Oct. 16, 2023, 3 pages, https://support.microsoft.com/en-us/office/compare-and-merge-two-versions-of-a-document-f5059749-a797-4db7-a8fb-b3b27eb8b87e.
Rook et al., "SAS® Macros as File Management Utility Programs", Paper 219-26, 2018, 5 pages.
Rudnicki et al., "An Overview of the Common Core Ontologies", CUBRC, White Paper, Oct. 25, 2016, 16 pages.
Rudnicki et al., "Best Practices of Ontology Development", CUBRC, Feb. 12, 2019, 27 pages.

* cited by examiner

DOCUMENT CONCATENATION AND ONTOLOGICAL STRUCTURING BASED ON SIMILARITIES

BACKGROUND

The present invention relates generally to the field of data processing and more particularly to file storage.

Oftentimes when collaborating with a group or after updating a document version within a cloud repository, a user may want to download a local copy of the document. When this is done multiple times, users may end up with multiple copies of the document in slightly different versions persisting in separate files on their machine.

BRIEF SUMMARY

Embodiments of the present invention disclose a method, a computer program product, and a system.

According to an embodiment of the present invention, a method for document concatenation and ontological structuring. The method includes identifying a downloaded file. The method further includes determining whether the downloaded file is associated with one or more saved files, and based on determining that the downloaded file is associated with the one or more saved files, developing an ontological structure storing the downloaded file and the one or more saved files.

According to a further embodiment of the invention, a computer program product for processing natural language text on a computer includes program code embodied on a non-transitory tangible storage device. The program code is executable by a processor of a computer to perform a method. The method includes identifying a downloaded file. The method further includes determining whether the downloaded file is associated with one or more saved files, and based on determining that the downloaded file is associated with the one or more saved files, developing an ontological structure storing the downloaded file and the one or more saved files.

According to a further embodiment of the invention, a computer system for processing natural language text on a computer includes one or more computer devices each having one or more processors and one or more tangible storage devices. The system further includes a program embodied on at least one of the one or more storage devices. The program includes a set of program instructions for execution by the one or more processors. The program instructions cause the one or more processors to execute a method. The method includes identifying a downloaded file. The method further includes determining whether the downloaded file is associated with one or more saved files, and based on determining that the downloaded file is associated with the one or more saved files, developing an ontological structure storing the downloaded file and the one or more saved files.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

In various types of computing environments, multiple versions of a document may be downloaded to a user's computer especially when a group is collaborating on a document via a cloud repository. This unnecessary duplication may cause confusion or even inefficiency in local storage utilization.

Currently, there is no way to concatenate prior versions of a file when a new version of the file is downloaded and to store the prior state (e.g., prior versions) in a separate ontological structure.

The present invention discloses a method for avoiding duplication of file data on a local machine when downloading multiple versions from a cloud repository.

Hereinafter, exemplary embodiments of the present invention will be described in detail with reference to the attached drawings.

The present invention is not limited to the exemplary embodiments below but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
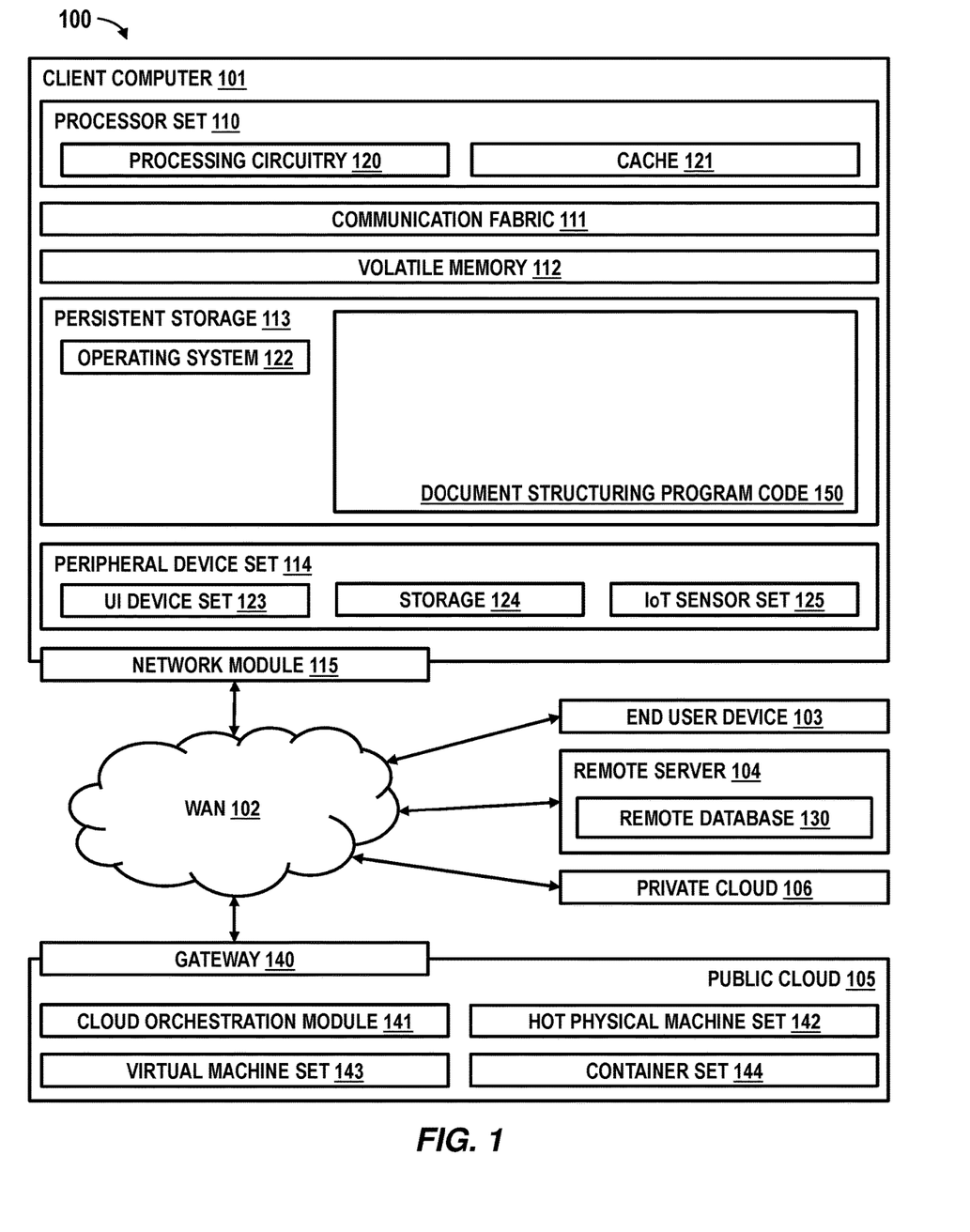
FIG. 1 depicts a diagram graphically illustrating the hardware components of a computing environment 100, such as document structuring computing environment 200, and a cloud computing environment, in accordance with an embodiment of the present invention.

FIG. 1 depicts a diagram graphically illustrating the hardware components of a computing environment 100, such as document structuring computing environment 200, and a cloud computing environment in accordance with an embodiment of the present invention.

Computing environment 100 contains an example of an environment for the execution of at least some of the computer code involved in performing the inventive methods, such as document structuring program code 150. In addition to the document structuring program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and document structuring program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in document structuring program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in document structuring program code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
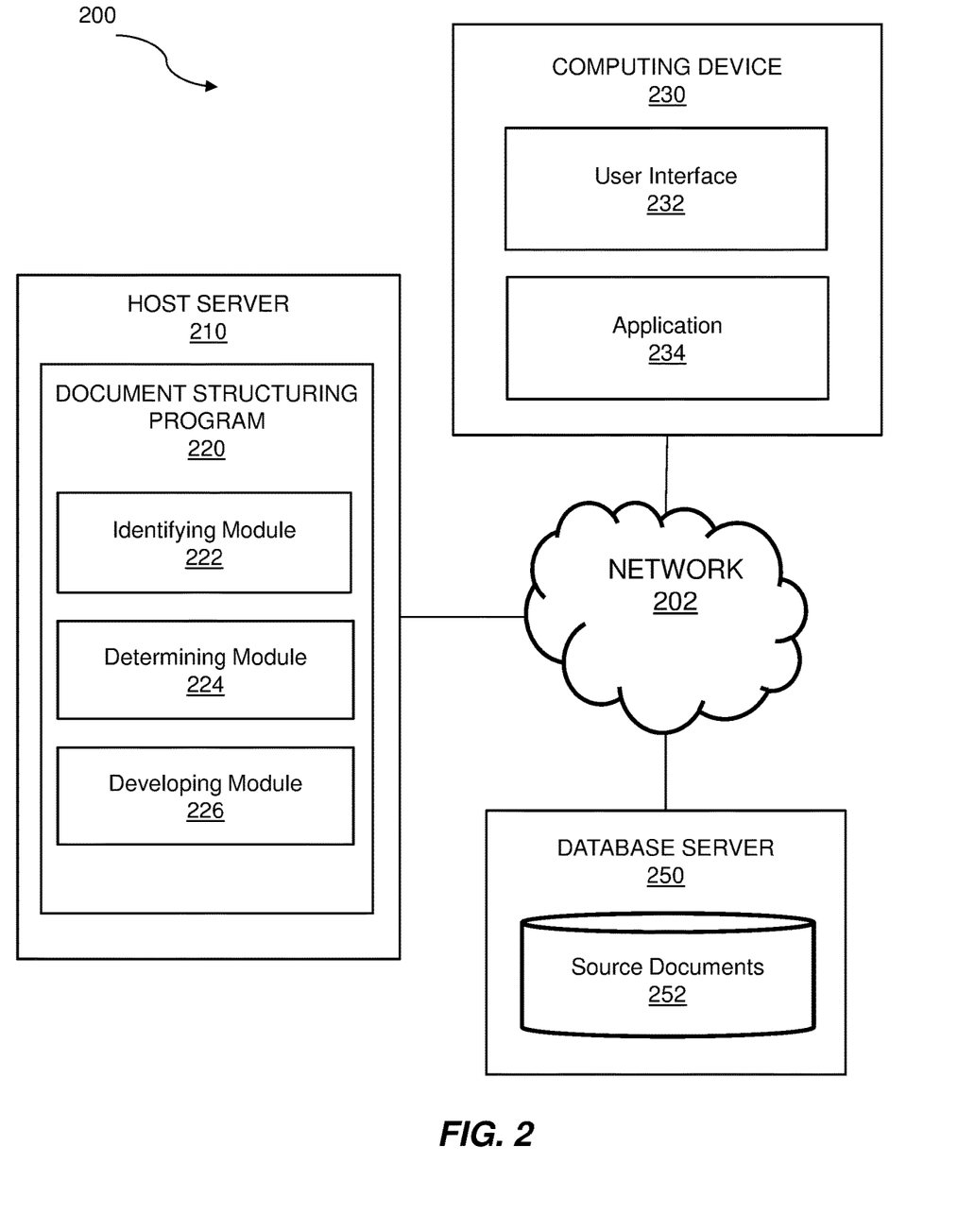
FIG. 2 illustrates document structuring computing environment 200, in accordance with an embodiment of the present invention.

FIG. 2 illustrates document structuring computing environment 200, in accordance with an embodiment of the present invention. Document structuring computing environment 200 includes host server 210, computing device 230, and database server 250, all connected via network 202. The setup in FIG. 2 represents an example embodiment configuration for the present invention and is not limited to the depicted setup to derive benefit from the present invention.

In an exemplary embodiment, host server 210 includes document structuring program 220. In various embodiments, host server 210 may be a laptop computer, tablet computer, netbook computer, personal computer (PC), a desktop computer, a personal digital assistant (PDA), a smart phone, or any programmable electronic device capable of communicating with computing device 230, and database server 250, via network 202. Host server 210 may include internal and external hardware components, as depicted, and described in further detail with reference to FIG. 1. In other embodiments, host server 210 may be implemented in a cloud computing environment, as further described in relation to FIG. 1. Host server 210 may also have wireless connectivity capabilities allowing it to communicate with computing device 230, database server 250, and other computers or servers over network 202.

With continued reference to FIG. 2, computing device 230 includes user interface 232 and application 234 and may be a laptop computer, tablet computer, netbook computer, personal computer (PC), a desktop computer, a personal digital assistant (PDA), a smart phone, or any programmable electronic device capable of communicating with host server 210 and database server 250 via network 102. Computing device 230 may include internal and external hardware components, as depicted, and described in further detail below with reference to FIG. 1. In other embodiments, computing device 230 may be implemented in a cloud computing environment, as described in relation to FIG. 1.

In exemplary embodiments, user interface 232 is a computer program which allows a user to interact with computing device 230 and other connected devices via network 202. For example, user interface 232 may be a graphical user interface (GUI). In addition to comprising a computer program, user interface 232 may be connectively coupled to hardware components, such as those depicted in FIG. 1, for receiving user input. In an exemplary embodiment, user interface 232 may be a web browser, however in other embodiments user interface 232 may be a different program capable of receiving user interaction and communicating with other devices.

In exemplary embodiments, application 234 may be a content repository application, a content repository, or a redundant cloud data storage.

In exemplary embodiments, a content repository application, or content share, is a database of digital content with an associated set of data management, search and access methods allowing application-independent access to the content, rather like a digital library, but with the ability to store and modify content in addition to searching and retrieving. The content repository acts as the storage engine for a larger application such as a content management system or a document management system, which adds a user interface on top of the repository's application programming interface.

With continued reference to FIG. 2, database server 250 comprises source documents 252 and may be a laptop computer, tablet computer, netbook computer, personal computer (PC), a desktop computer, a personal digital assistant (PDA), a smart phone, or any programmable electronic device capable of communicating with host server 210 and computing device 230 via network 202.

In exemplary embodiments, source documents 252 includes files on the computing device 230, local storage, operating system, and/or content repository applications. Source documents 252 may be downloaded or shared with a user. Documents within source documents 252 may be structured, i.e. include metadata, or unstructured and are written in programming languages of common file formats such as .docx, .doc, .pdf, .rtf, etc.

With continued reference to FIG. 2, host server 210 includes document structuring program 220. Host server 210 may be a laptop computer, tablet computer, netbook computer, personal computer (PC), a desktop computer, a personal digital assistant (PDA), a smart phone, or any programmable electronic device capable of communicating with computing device 230 and database server 250 via network 202.

The subject disclosure provides a novel framework and method for document concatenation and ontological structuring to avoid duplication of file data on a local machine when downloading multiple versions from a cloud repository. The subject disclosure runs a command-based logic within the background of an operating system to provide a structure of a parent/child relationship between documents.

With continued reference to FIG. 2, document structuring program 220, in an exemplary embodiment, may be a computer application on host server 210 that contains instruction sets, executable by a processor. The instruction sets may be described using a set of functional modules. In exemplary embodiments, document structuring program 220 may receive input from computing device 230 and database server 250 over network 202. In alternative embodiments, document structuring program 220 may be a computer application on computing device 230, or a stand-alone program on a separate electronic device.

With continued reference to FIG. 2, the functional modules of document structuring program 220 include identifying module 222, determining module 224, and developing module 226.

Figure 3:
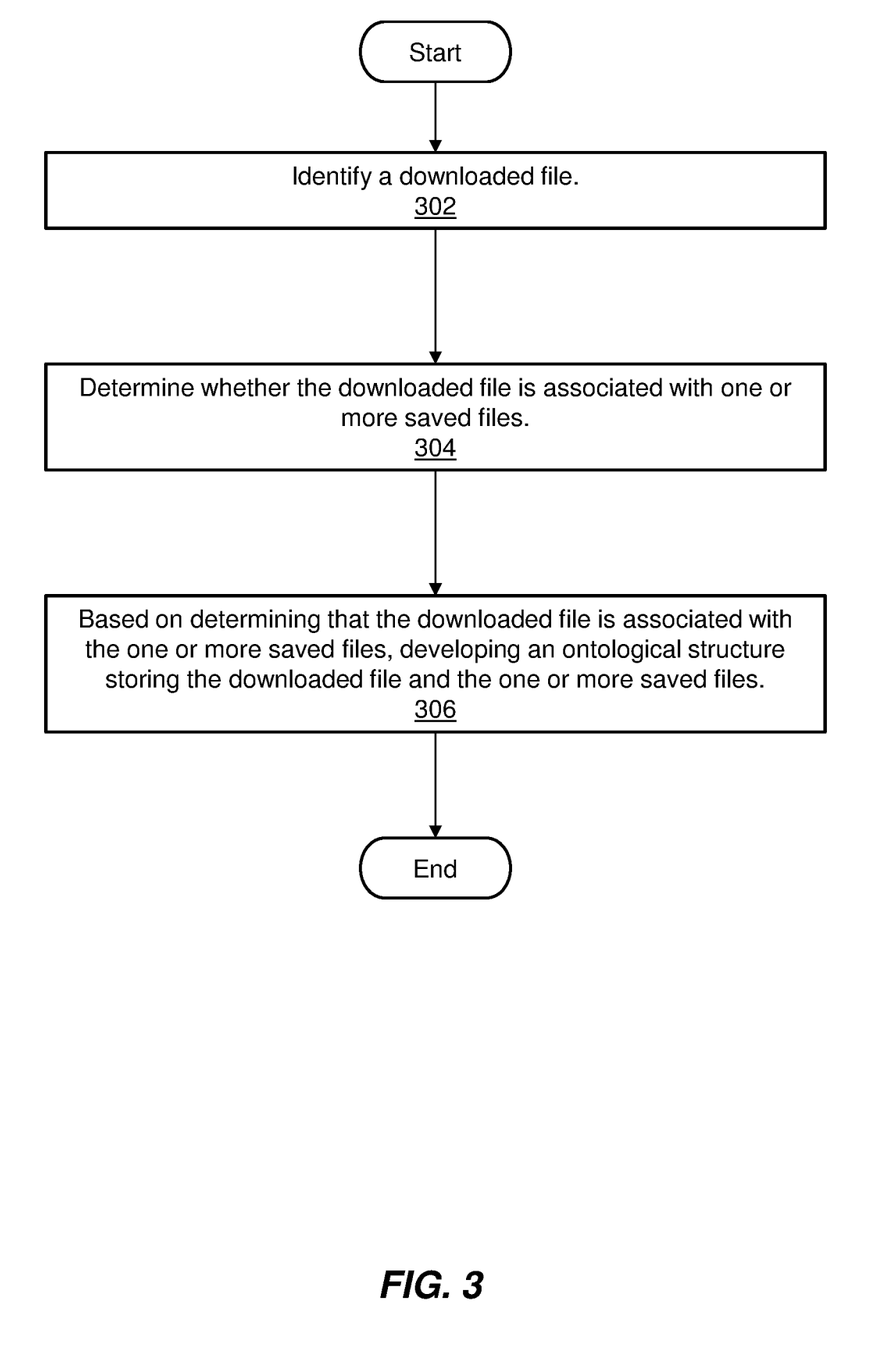
FIG. 3 is a flowchart illustrating the operation of document structuring program 220 of FIG. 2, in accordance with an embodiment of the present invention.

FIG. 3 is a flowchart illustrating the operation of document structuring program 220 of FIG. 2, in accordance with embodiments of the present disclosure.

With reference to FIGS. 2 and 3, identifying module 222 includes a set of programming instructions in document structuring program 220, to identify a downloaded file (step 302). The set of programming instructions is executable by a processor.

In exemplary embodiments, a user opts into document structuring program 220, thereby allowing the invention to modify a user's operating system (OS) and integrate with a user's content repository applications, such as application 234, on computing device 230.

In exemplary embodiments, a user's OS may include the files locally installed and the user's graphical user interface (GUI).

In exemplary embodiments, document structuring program 220 integrates with content repository applications and indexes all the files on a user's OS at the time of module activation. The invention indexing captures details, or file related metadata, for each document. Such details may include document structure and relationship based on derivate copy and paste; document download location based on application outbound and inbound request for the file; and in some instances, the user may manually deem a product to be either a template (where reuse is expected and to not ontologically align) or unique (where ontological alignment is expected).

In exemplary embodiments, identifying module 222 identifies the document details for each downloaded file, such as file name, file source uniform resource locator (URL), file content makeup, OS level copy/paste functionality, and any other file identifier known to one of ordinary skill in the art.

With continued reference to FIGS. 2 and 3, determining module 224 includes a set of programming instructions in document structuring program 220, to determine whether the downloaded file is associated with one or more saved files (step 304). The set of programming instructions are executable by a processor.

In exemplary embodiments, the association is determined via artificial intelligence (AI)-driven natural language inference. Natural language inference is the task of determining whether a "hypothesis" is true (entailment), false (contradiction), or undetermined (neutral) given a "premise".

In further exemplary embodiments, determining module 224 utilizes a source document download location for contextualization.

The use of AI-driven natural language inference enhances the accuracy of determining document similarity and enables dynamic ontological structuring based on context. The ability to mark files as "template" or "unique" provides customizable organizational options based on user intent.

Furthermore, the generation of a file that embeds similar files allows for efficient navigation within the OS. These novel features improve user experience, reduce duplication of file data, and optimize storage utilization.

In exemplary embodiments, at least one of the one or more saved files is marked as a template, and wherein the ontological structure is based on the at least one template. For example, a saved file may be named "Invention Template ZAS Updated.docx" and marked as a template. Successive files may be named "Invention Template ZAS(3).docx", "Invention Template ZAS(4).docx", and so forth.

The features of document concatenation and ontological structuring based on document similarity within a file system allows for efficient storage utilization and avoidance of unnecessary duplication of files on local machines. Additional, ontological structuring ensures clear organization and easy navigation of documents based on their relationships.

In alternative embodiments, an association between a downloaded file and one or more related system (or saved) files is determined via generated vector embeddings. The use of generated vector embeddings enhances the accuracy of determining relationships between downloaded files and related system files.

The use of ontological structure and generated vector embeddings are novel features that improve data management, collaboration, and overall productivity.

With reference to an illustrative example, user A has activated the document structuring program 220 on his operating system. As such, document structuring program 220 has indexed all locally stored files as well as user A's content repository files, thus capturing document details for all files. User A has downloaded a new file detailing a business proposal. Determining module 224 has determined that the file content and date of creation is similar to another file that user A has on his local storage.

With continued reference to FIGS. 2 and 3, developing module 226 includes a set of programming instructions in document structuring program 220, to develop an ontological structure storing the downloaded file and the one or more saved files, based on determining that the downloaded file is associated with the one or more saved files (step 306). The set of programming instructions are executable by a processor.

In exemplary embodiments, developing module 226 allows a user to mark a file as a template or as a unique document for determination of an ontological relationship.

In exemplary embodiments, developing module 226 generates a file that has similar files embedded into the generated file to maintain operating system navigation efficiency.

In exemplary embodiments, as files are added, moved, or copied to the file system, developing module 226 activates the ontological reassignment. Ontological reassignment looks to the file system and captures the derivative files based on criteria including, but not limited to, same file name, same file source URL, similar file content makeup, and OS level copy and paste functionality.

Based on the ontological reassignment, a file or folder are automatically created for related contextual documents in a tree hierarchy indicating their derivations or it may include the documents in an ordered pattern based on predetermined factors (e.g., from least to most content or document size). The tree hierarchy then represents the source file and associated, less or more, complex derived files.

The GUI of the file system explorer adds additional functionality to files where derivatives are branched off from the source.

In alternative embodiments, creating the ontological structure includes assigning a file or folder to include the source file and related/similar contextual documents. Related/similar contextual documents may include the same file name, same file source, similar file content, and so forth. Further, creation of the ontological structure may include user options, such as to add, delete, merge, and/or compare the source documents and the related/similar contextual documents.

With continued reference to the illustrative example above, developing module 226 creates an ontological structure on user A's local storage to store and organize the recently downloaded file detailing a business proposal with the existing documents that are of similar nature. These documents are stored in a tree hierarchy to indicate their derivations (e.g., date of creation, file name, content makeup, and so forth).

In additional embodiments, the processing pertaining to document structuring program 220 occurs autonomously when any document is triggered by a user-stated request, downloaded, or prepared for an application processing usage. This will allow for the overall structure to be generated and managed on demand when required.

Furthermore, when the overall structure is generated and managed on demand, the system may check for relevancy indicators to determine the processing logic. These indicators may have various types of processing logic. For example, various types of relevance indicators for unique case selection may include "always on processing", "variable processing", and "discontinue processing".

"Always on processing" is when the system identifies documents as being for a corporate business setting and always utilizes the full autonomy processing logic.

"Variable processing" is when the system identifies the documents as being managed for the small side business and these documents would fall under the "it depends" logic. These documents would be based on typical reference to certain practices that can be learned through user engagement and a machine learning knowledge corpus to train the system. The documents may or may not be processed based on previous historical usage patterns.

"Discontinue processing" is if documents are identified within areas (e.g., personal documents) that are to be shut off from processing, the system will automatically discontinue engagement based on the personal documents indication, marking, or indicator evidence for personal relevance scoring indicator.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, computing device 230, and database server 250.

What is claimed is:

1. A computer-implemented method for document concatenation and ontological structuring, comprising:
   identifying a downloaded file;
   determining whether the downloaded file is associated with one or more saved files; and
   based on determining that the downloaded file is associated with the one or more saved files, generating a dynamic ontological structuring of the downloaded file based on context derived from an artificial intelligence (AI) driven natural language inference, and storing the downloaded file and the one or more saved files;
   activating ontological reassignment of the downloaded file and the one or more saved files based on criteria selected from a group comprising same file name, same file source uniform resource locator (URL), similar file content, and operating system (OS) level copy and paste functionality, wherein the ontological reassignment comprises creating a folder that includes the downloaded file, the one or more saved files, and related contextual documents in a tree hierarchy indicating file derivations; and
   adding customizable organizational functionality to the file derivations in the tree hierarchy based on user intent, via a graphical user interface (GUI) of a file system explorer.

2. The computer-implemented method of claim 1, wherein the association is determined via natural language inference.

3. The computer-implemented method of claim 1, wherein at least one of the one or more saved files is marked as a template, and wherein the ontological structure is based on the at least one template.

4. The computer-implemented method of claim 1, wherein the association is determined via generated vector embeddings.

5. The computer-implemented method of claim 1, further comprising:
   utilizing a source document download location for contextualization.

6. The computer-implemented method of claim 1, further comprising:
   allowing a user to mark a file as a template or as a unique document for determination of an ontological relationship.

7. The computer-implemented method of claim 1, further comprising:
   generating a file that has similar files embedded into the generated file to maintain operating system navigation efficiency.

8. A computer program product for providing a framework to identify questions and answers dynamically from a dataset based on previous learning and an evaluation score of a user, comprising a non-transitory tangible storage device having program code embodied therewith, the program code executable by a processor of a computer to perform a method, the method comprising:
   identifying a downloaded file;
   determining whether the downloaded file is associated with one or more saved files; and
   based on determining that the downloaded file is associated with the one or more saved files, generating a dynamic ontological structuring of the downloaded file based on context derived from an artificial intelligence (AI) driven natural language inference, and storing the downloaded file and the one or more saved files;
   activating ontological reassignment of the downloaded file and the one or more saved files based on criteria selected from a group comprising same file name, same file source uniform resource locator (URL), similar file content, and operating system (OS) level copy and paste functionality, wherein ontological reassignment comprises creating a folder that includes the downloaded file, the one or more saved files, and related contextual documents in a tree hierarchy indicating file derivations; and
   adding customizable organizational functionality to the file derivations in the tree hierarchy based on user intent, via a graphical user interface (GUI) of a file system explorer.

9. The computer program product of claim 8, wherein the association is determined via natural language inference.

10. The computer program product of claim 8, wherein at least one of the one or more saved files is marked as a template, and wherein the ontological structure is based on the at least one template.

11. The computer program product of claim 8, wherein the association is determined via generated vector embeddings.

12. The computer program product of claim 8, further comprising:
    utilizing a source document download location for contextualization.

13. The computer program product of claim 8, further comprising:
    allowing a user to mark a file as a template or as a unique document for determination of an ontological relationship.

14. The computer program product of claim 8, further comprising:
generating a file that has similar files embedded into the generated file to maintain operating system navigation efficiency.

15. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
identifying a downloaded file;
determining whether the downloaded file is associated with one or more saved files; and
based on determining that the downloaded file is associated with the one or more saved files, generating a dynamic ontological structuring of the downloaded file based on context derived from an artificial intelligence (AI) driven natural language inference, and storing the downloaded file and the one or more saved files;
activating ontological reassignment of the downloaded file and the one or more saved files based on criteria selected from a group comprising same file name, same file source uniform resource locator (URL), similar file content, and operating system (OS) level copy and paste functionality, wherein ontological reassignment comprises creating a folder that includes the downloaded file, the one or more saved files, and related contextual documents in a tree hierarchy indicating file derivations; and
adding customizable organizational functionality to the file derivations in the tree hierarchy based on user intent, via a graphical user interface (GUI) of a file system explorer.

16. The computer system of claim 15, wherein the association is determined via natural language inference.

17. The computer system of claim 15, wherein at least one of the one or more saved files is marked as a template, and wherein the ontological structure is based on the at least one template.

18. The computer system of claim 15, wherein the association is determined via generated vector embeddings.

19. The computer system of claim 15, further comprising:
utilizing a source document download location for contextualization.

20. The computer system of claim 15, further comprising:
allowing a user to mark a file as a template or as a unique document for determination of an ontological relationship.

* * * * *